US 6,548,089 B2

(12) United States Patent
Hoier et al.

(10) Patent No.: US 6,548,089 B2
(45) Date of Patent: Apr. 15, 2003

(54) DAIRY STARTER CULTURE DELIVERY SYSTEM AND USE HEREOF

(75) Inventors: Erik Hoier, Valby (DK); Kristian Elsborg, Holbaek (DK); Esben Laulund, Hellerup (DK)

(73) Assignee: Chr. Hansen A/S, Horsholm (DK)

( * ) Notice: Subject to any disclaimer, the term of this patent is extended or adjusted under 35 U.S.C. 154(b) by 0 days.

(21) Appl. No.: 09/988,779

(22) Filed: Nov. 20, 2001

(65) Prior Publication Data
US 2002/0054936 A1 May 9, 2002

Related U.S. Application Data

(62) Division of application No. 09/155,565, filed as application No. PCT/DK98/00365 on Aug. 24, 1998, now Pat. No. 6,335,040, which is a continuation of application No. 08/917,080, filed on Aug. 25, 1997, now abandoned.

(51) Int. Cl.[7] .................... A23C 19/32; A23C 9/132; C12M 1/26
(52) U.S. Cl. .............. 426/34; 426/42; 426/43; 426/61; 426/63; 426/580; 435/309.2
(58) Field of Search ............... 426/34, 42, 43, 426/61, 63, 580; 435/309.2

(56) References Cited

U.S. PATENT DOCUMENTS

| 3,184,395 A | 5/1965 | Brewer ............... 435/252.1 |
| 3,369,708 A | 2/1968 | Hein et al. ............... 222/85 |
| 4,053,642 A | 10/1977 | Hup et al. ............... 426/36 |
| 4,115,199 A | 9/1978 | Porubcan et al. ............... 195/96 |
| 4,785,676 A | * 11/1988 | DeOca et al. ............... 73/863.85 |
| 4,941,517 A | * 7/1990 | Galloway ............... 141/1 |
| 5,326,165 A | 7/1994 | Walthall et al. ............... 366/165 |
| 5,507,133 A | 4/1996 | Singleton et al. ............... 53/474 |
| 5,736,398 A | 4/1998 | Giambernardi et al. ............... 435/383 |
| 5,979,300 A | 11/1999 | Donovan ............... 99/323 |

FOREIGN PATENT DOCUMENTS

| DE | 1 792 264 | 10/1971 |
| EP | 0 369 617 | 5/1990 |
| EP | 0 611 820 | 8/1994 |
| FR | 2 301 004 | 9/1976 |
| FR | 2 502 465 | 3/1981 |
| FR | 2 710 073 | 3/1995 |
| WO | 85/02980 | 7/1985 |
| WO | 94-27645 | 12/1994 |
| WO | 96-03052 | 2/1996 |

OTHER PUBLICATIONS

Rasic, "Youghurt," pp.314–319 (1978).
Lelieveld, H., "Continuous Fermentation in Yoghurt Manufacture," Process Biochemistry, vol. 11, No. 5, pp. 39 (Jun. 1976).
Yang, "Acid–Producing Activity of Lyophilized Streptococcal Cheese Starter Concentrates," Journal of Dairy Science, vol. 62, No. 6, pp. 908–915 (1979).

* cited by examiner

Primary Examiner—Nina Bhat
(74) Attorney, Agent, or Firm—Foley & Lardner

(57) ABSTRACT

A delivery system for introduction of a starter culture directly into a dairy process line, comprising a sealed enclosure having outlet means for connecting the enclosure to the process line, the sealed enclosure containing the starter culture and/or milk clotting enzyme. The system can be used to introduce a dairy starter culture directly into a closed dairy process line without risk of contamination.

14 Claims, 3 Drawing Sheets

DAIRY STARTER CULTURE DELIVERY SYSTEM AND USE HEREOF

This application is a divisional of Ser. No. 09/155,565, now U.S. Pat. No. 6,335,040, filed on Sep. 30, 1998, which claims benefit under 35 U.S.C. 371 of PCT/DK98/00365 filed Aug. 24, 1998, which is a continuation of Ser. No. 08/917,080, filed Aug. 25, 1997, now abandoned.

FIELD OF INVENTION

The present invention relates to the field of manufacturing dairy products by the use of starter cultures and it provides a safe and convenient system for delivery of such starter cultures directly into the dairy process line.

TECHNICAL BACKGROUND AND PRIOR ART

Microorganisms are involved in the manufacture of most dairy products. Bacterial cultures, in particular bacteria which are generally classified as lactic acid bacteria are essential in the making of all fermented milk products, cheese and butter. Cultures of such harmless bacteria are called dairy starters and they impart specific features to various dairy products by performing a number of functions.

Thus, as an example, the starter cultures ferment lactose to lactic acid, and since the coagulation time by milk clotting enzymes is decreased by the increase in milk acidity, starter cultures aid the enzymatic coagulation of milk in cheese making.

A further example is that the rapid lactic acid development throughout the production process caused by the starter cultures restricts the growth of contaminating microorganisms. In cheese making, the starter culture promotes the exudation of whey from the curd. The lactic acid-producing bacteria also produce proteolytic enzymes, which aid the degradation of cheese proteins which makes an important contribution to the ripening of cheese. Additionally, lactic acid bacterial cultures ferment lactose and citric acid to aromatic compounds, such as diacetyl and acetaldehyde which confer a desired aroma and taste to the fermented milk products.

Commercial dairy starter cultures are generally composed of lactic acid-producing and citric acid-fermenting lactic acid bacteria. In the present context, the expression "lactic acid bacteria" designates a group of gram positive, microaerophilic or anaerobic bacteria which ferment sugar with the production of acids including lactic acid as the predominantly produced acid, acetic acid, formic acid and propionic acid. The industrially most useful lactic acid bacteria are found among Lactococcus species, Streptococcus species, Lactobacillus species, Leuconostoc species, Pediococcus species and Brevibacterium species.

Commonly used dairy starter culture strains of lactic acid bacteria are generally divided into mesophilic organisms having an optimum growth temperature at about 30° C. and thermophilic organisms having optimum growth temperature in the range of about 40 to about 45° C. Typical organisms belonging to the mesophilic group include *Lactococcus lactis* subsp. *lactis, Lactococcus lactis* subsp. *cremoris, Leuconostoc cremoris, Lactobacillus delbrueckii* subsp. *bulgaricus, Lactococcus lactis* subsp. *lactis* biovar. *diacetylactis, Lactobacillus casei, Streptococcus durans* and *Streptococcus faecalis*. Thermophilic lactic acid bacterial species include as examples *Streptococcus thermophilus, Lactobacillus lactis, Lactobacillus helveticus, Lactobacillus bulgaricus* and *Lactobacillus acidophilus*.

Also the strict anaerobic bacteria belonging to the genus Bifidobacterium including *Bifidobacterium bifidum* and *Bifidobacterium longum* are commonly used as dairy starter cultures and are generally included in the group of lactic acid bacteria. Additionally, species of Propionibacterium are used as dairy starter cultures, in particular in the manufacture of cheese.

Another group of microbial starter cultures are fungal cultures, including yeast cultures and cultures of filamentous fungi, which are particularly used in the manufacture of certain types of cheese. Examples of currently used cultures of fungi include *Penicillium roqueforti, Penicillium candidum, Geotrichum candidum, Torula kefir* and *Saccharomyces kefir*.

Presently, commercial starter cultures are distributed as frozen concentrates in a medium of milk components, nutrients and growth stimulating compounds. Under these conditions, the viability of the cultures is preserved for extended periods of time, and after thawing the cultures can be inoculated directly into milk without intermediate transfer. Such cultures are commonly referred to as direct vat set (DVS)-cultures. Another presentation of commercial DVS-starter cultures is as freeze-dried or lyophilized cultures in the form of a powder. In this form, the starter can be shipped without refrigeration, but storage below freezing temperature is recommended.

Although commercial dairy starters thus are available as cultures which can be added directly to milk without any intermediate transfer or propagation, it is not uncommon that dairies produce in-house bulk starters at regular intervals depending on the requirement. A bulk starter is defined as a starter culture propagated at the dairy plant for inoculation into milk. Such bulk starters are generally made by inoculating heat treated milk with a volume of a previous bulk starter or with a freeze-dried or frozen starter culture preparation, followed by incubating the thus inoculated milk under conditions permitting the starter culture strain(s) to propagate for a sufficient period of time to provide a desired cell number. The incubation period is typically in the range of 18 to 24 hours.

However, these currently used methods of applying dairy starters involve several problems in modern dairy plants where process lines including reservoirs, vessels, containers, vats, centrifuges, heat treatment equipment, filling equipment and pipelines connecting the elements of the process line are essentially completely closed systems. Any process step which involves that the closed system be opened to the environment evidently involves a serious risk of contaminating the process line with undesired organisms such as milk spoilage bacteria, e.g. Bacillus species or gram negative bacteria or bacteriophages which attack the starter culture organisms resulting in fermentation failures.

In addition to the risk of contaminating the process line, use of bulk starters propagated at the dairy involves the following problems: (i) the preparation of the bulk starter is very labour intensive and it occupies much space and equipment, (ii) there is a considerable risk of contamination with spoilage bacteria and/or phages during the step of propagation and (iii) by passing a mixed population of starter bacteria from one bulk starter to the next, a selection of strains will occur over time whereby the initial desired characteristics of the culture may deteriorate. Similar to the use of bulk starters, the use of DVS-starter cultures also involves a risk of contamination and implies a high degree of manual handling.

In the dairy industry there is a clear trend towards increasingly larger production units. It is therefore evident that the above problems associated with the current use of starter cultures have become more prominent and enlarged.

It is therefore an important objective of the present invention to provide an improved method of delivering dairy starter cultures to the process line which method is not only adapted to the increasing demand for stricter control of contamination of closed dairy process lines but which also implies that the above problems associated with in-plant bulk starter propagation can be reduced or eliminated. Additionally, the starter culture delivery system which is provided herein implies a high degree of convenience for the user.

SUMMARY OF THE INVENTION

Accordingly, it is the primary objectives of the invention to provide a method whereby milk which is processed in a closed dairy process line can be inoculated with the appropriate starter culture directly into the process line, and a starter culture delivery system which is useful in such a method.

Thus, in a first aspect, the invention pertains to a method of preparing a dairy product, the method comprising the steps of (i) providing a microbial starter culture as a culture concentrate in a sealed enclosure which is provided with outlet means for connecting the enclosure to a dairy process line, (ii) combining the microbial starter culture with an aqueous medium to obtain an aqueous suspension of the microbial starter culture, (iii) combining said starter culture suspension with milk in the dairy process line, and (iv) optionally keeping the thus inoculated milk under starter culture fermenting conditions, to obtain the dairy product.

When a inoculated and fermented milk is processed further into cheese, a milk clotting enzyme must be added to provide the curd. It is one specific object of the invention to provide a method of preparing cheese whereby the sealed enclosure in addition to the starter culture contains the milk clotting enzyme.

It is, however, conceivable that an enclosure as described herein can contain the milk clotting enzyme without a starter culture and that the process of preparing a cheese includes the use of separate enclosures according to the invention containing starter culture or milk clotting enzyme which is hereby introduced into the process line separately, e.g. with a difference in time.

It is another aspect of the invention to provide a delivery system for inoculation of a dairy starter culture into a dairy process line, the system comprising a sealed enclosure containing a concentrate of a starter culture and/or a milk clotting enzyme, said enclosure is provided with outlet means for connecting the enclosure to the dairy process line, said outlet means permitting the connection of the enclosure to the dairy process line to obtain delivery of the starter culture into the process line.

DETAILED DISCLOSURE OF THE INVENTION

It is an essential feature of the method which is provided herein for preparing a dairy product that the starter culture used for inoculation of milk can be supplied to the dairy plant as a culture concentrate such as e.g. frozen, dried or liquid culture concentrate contained in a sealed enclosing packaging which is provided with outlet means for connecting the packaging directly to the process line.

The method according to the invention is based on the surprising finding that a starter culture in frozen, dried or liquid state, as described above, can maintain its viability and fermenting activity for a considerable period of time after it has been suspended in an aqueous medium. The aqueous medium can be water including tap water, distilled water or deionized water, or it can be any aqueous medium which is suitable for suspending a dairy starter culture such as milk, suspensions of milk solids, whey or solutions containing a salt. The aqueous medium can further comprise buffering agents and/or microbial nutrients.

Thus, in a presently preferred embodiment the method according to the invention comprises the steps of providing a microbial starter culture as a culture concentrate as mentioned above in a sealed enclosure which is provided with outlet means for connecting the enclosure to a suspension container. The suspension container is provided with means for engaging the enclosure with the suspension container and outlet means for connecting the suspension container to other units of the process line. The introduction of the starter culture into the suspension container is done by connecting, under essentially aseptic conditions, the outlet means of the enclosure to the engaging means of the suspension container, and combining the introduced starter culture with an aqueous medium to obtain a suspension of the culture in the suspension container. Subsequently, the starter culture suspension is introduced into the process line, under essentially aseptic conditions, through the connection between the outlet means of the suspension container and one or more process line units, whereby the starter culture suspension is combined with the milk.

It will be understood that the suspension container used in the above method, if desired, can be provided with further means such as air inlet means, agitating means, water inlet means, cooling means, means for suspending the sealed enclosure, means for monitoring temperature, means for applying a gas, such as a modified atmosphere, and means for measuring pH. The size of the suspension container will i.a. depend on the production scale of the dairy plant. Thus, in a specific embodiment, the suspension container has a cubic content of at least 100 liters, e.g. at least 500 liters including at least 1000 liters.

As mentioned above, the starter culture concentrate is combined with the aqueous medium in the suspension container. Additionally, at least one further substance such as e.g. a milk clotting enzyme, a bacterial nutrient, a milk clotting enzyme stabilizing agent, a chlorine neutralizing agent, a flavouring agent, a colouring agent, a fermented milk thickening agent and a fermented milk stabilizing agent can be added to the suspension container In one useful embodiment of the method according to the invention, the sealed enclosure containing the starter culture concentrate as mentioned above is provided with inlet means, and outlet means for connecting the enclosure to the process line. The inlet means serves the purpose of permitting the introduction of an aqueous medium into the enclosure containing the starter culture concentrate, without the risk of contaminating the starter culture, to obtain an aqueous suspension of the culture in the enclosure. When a suspension of the starter culture in the still sealed enclosure has been obtained, the suspension is introduced into the dairy process line that contains milk. This introduction of the suspended starter culture, that results in inoculation of the milk starting material, is performed by connecting, under essentially aseptic conditions, the outlet means of the enclosure to one or more process line units, whereby the starter culture suspension is combined with the milk.

The connection means may in itself be provided with fittings which can be directly attached to corresponding connecting parts in or on the process line or the connection may be established via a suitable pipeline, such as e.g. a pipeline provided with a clean-click system, or tubing. In order to secure aseptic connection of the enclosure any known precautionary measure can be taken such as sterilization of the connecting means by heat or chemical biocidal agents including an alcohol.

Ordinary tap water can, as mentioned above, be used for providing the suspension of the starter culture in the enclosure or in the above-mentioned suspension container. To serve that purpose, the inlet means of the enclosure and/or the water inlet means of the suspension container may be provided with filtering means which is preferably provided with a membrane filter member having a pore size which at least prevents bacteria from passing, e.g. a pore size of 0.45 $\mu$m or less such as 0.20 $\mu$m. Additionally, the filtering means can be provided with pre-filtering means placed in front of the sterile filter to retain particulate matter such as mineral particles occurring in tap water or it may contain an agent that neutralizes or absorbs chlorine and other biocidally active agents which may occur in water systems. In suitable embodiments, the filtering means is also provided with means for connecting the filtering means to the aqueous medium outlet such as a water tap.

In many countries, biocidal agents such as chlorine is added to the public water system. As it is known in the dairy industry, even traces of such agents may inhibit the activity of starter cultures or even have a killing effect on the cultures. To prevent such effects, the filtering means may be provided with substances which can neutralize such biocidal agents. As an example, sodium thiosulphate which neutralizes chlorine, or carbon, can be incorporated.

As mentioned above, when the starter culture concentrate is combined with the aqueous medium, a suspension of the starter culture is obtained. When the culture concentrate is combined with the aqueous medium in the sealed enclosure, it may be necessary to shake or agitate the filled enclosure to have the culture organisms homogeneously suspended. Optionally, the enclosure packaging as supplied may contain solid, insoluble particles e.g. of polymers, glass or metal to facilitate suspending of the culture. Likewise, means for agitating or any other known methods for obtaining a homogenous distribution of the culture in the above suspension container may be used.

If the enclosure packaging contains solid particles as mentioned above, the connecting means of the enclosure may suitably be provided with means for retaining such particles or such means can be incorporated in the process line.

The introduction of the starter culture suspension into the process line may occur due to gravity or the introduction is made by means of pumping means.

Subsequent to the introduction of the starter culture into the milk starting material, the thus inoculated milk may be processed further to obtain a finished dairy such as cheese, yoghurt, butter, inoculated sweet milk or a liquid fermented milk product, such as e.g. buttermilk or drinking yoghurt. Such further processing steps are carried out by conventional process steps.

Thus, in the manufacturing of fermented dairy products the inoculated milk is kept under starter culture fermenting conditions to obtain the fermented dairy product. These conditions include the setting of a temperature which is suitable for the particular starter culture strains. Thus, when the starter culture comprises mesophilic lactic bacteria, the temperature is about 30° C. and, if the culture comprises thermophilic lactic acid bacterial strains, the temperature is kept in the range of 35 to 50° C. such as 40 to 45° C.

It is also within the scope of the invention to provide a method of producing milk products which contain lactic acid bacteria but which are not subjected to fermentation conditions after the starter culture is added. A typical example of such a starter culture-inoculated "sweet" milk product is "sweet adidophilus milk", which is also commonly referred to as a probiotically active product.

In an advantageous and highly convenient embodiment, the sealed enclosure is made of a flexible material as it is described in detail in the following. The use of a flexible material implies that the packaging after loading with the starter culture can be evacuated prior to being sealed airtightly whereby the enclosing packaging will fill up as little as possible. Evidently, this facilitates distribution and reduces the requirement for storage space significantly. The enclosure may also be filled with a non-atmospheric gas prior to sealing. It will be understood, that the expression "non-atmospheric gas" relates to an inert gas or to a modified atmosphere such as e.g. $N_2$ and $CO_2$.

The size of the packaging enclosure will i.a. depend on the production scale of the dairy plan. As explained in the following, a highly advantageous feature of the invention is that the starter culture delivery system can be adapted to comply with the particular needs of individual users. This applies both to the amount and composition of the starter culture, the type and amount of further active components and additives and the cubic content of the enclosure. Thus, in a specific embodiment, the sealed enclosure has a cubic content of at least 10 liters, e.g. at least 20 liters such as at least 100, e.g. at least 250 liters including at least 500 liters, e.g. at least 750 liters or at least 1000 liters.

In accordance with the invention, any starter culture organism which is of use in the dairy industry can be used. Thus, the starter culture can be selected from a lactic acid bacterium, a Bifidobacterium species, a Propionibacterium species or a fungal species such as Torula species and Saccharomyces species. Suitable cultures of the lactic acid bacterial group include commonly used strains of a Lactococcus species, a Streptococcus species, a Lactobacillus species include the Lactobacillus acidophilus and a Leuconostoc species. Lactococcus species include the widely used *Lactococcus lactis,* including *Lactococcus lactis* subsp. *lactis* and *Lactococcus lactis* subsp. *cremoris* which are commonly used in the manufacture of cheeses with a closed texture, e.g. Cheddar, Feta and cottage cheese.

As it is usual in the dairy industry, the starter culture may comprise a mixture of strains including a mixture of strains of different lactic acid bacterial species, such as e.g. a mixture of *Streptococcus thermophilus* and *Lactobacillus delbrueckii* subsp. *bulgaricus.*

The specific selection of strains in the starter culture will depend on the particular type of fermented dairy product to be manufactured. Thus, for cheese and butter manufacturing, mesophilic cultures of Streptococcus, Leuconostoc and Lactobacillus are widely used, whereas for yoghurt and other fermented milk products, thermophilic strains of Streptococcus species and of Lactobacillus species are used.

In the manufacture of cheese, a milk clotting enzyme or a rennet is added to the milk to provide a curd which is then separated from the whey. Such milk clotting enzymes may be derived from different sources. The traditional rennet product is rennet which is extracted from stomach tissue of bovines and other animals, in particular from calf stomachs. Currently, the most active milk clotting enzyme which is found in stomach tissues, chymosin, is also being produced by means of recombinant microorganisms. Additionally, commercial milk clotting enzymes include the so-called microbial coagulants which are proteolytic enzymes naturally produced by e.g. Bacillus species and filamentous fungi.

Generally, milk clotting enzymes are most active at acidic pH levels and therefore cheese milk is conventionally acidified by adding lactic acid bacterial starter cultures following which the milk clotting enzyme is added.

It has now been found that it is possible to add the starter culture and the milk clotting enzyme preparation simultaneously to the cheese milk and obtain a satisfactory cheese manufacturing process including a yield of cheese which is comparable with that obtained with the conventional process. It was also found that cheese starter cultures can retain viability and metabolic activity in an aqueous phase containing a milk clotting enzyme. These unexpected findings has made it possible to provide a method according to the invention wherein the starter culture concentrate is provided in the sealed enclosure in combination with a milk clotting enzyme as mentioned above.

It is an advantageous feature of the method according to the invention that a suspension/solution of the starter culture and/or the milk clotting enzyme which is prepared according to the present invention is stable with respect to viability and metabolic activity for an extended period of time, such as up to and including 24 hours or longer such as up to and including 48 hours or even up to and including 72 hours or longer. Evidently, this feature implies that the method is very flexible in that several starter culture suspensions for use over 1–3 or more days can be prepared simultaneously and used when needed.

The preferred temperature at which the starter culture suspension is kept is at the most 20° C., e.g. at the most 15° C., such as at the most 12° C. including at the most 10° C., e.g. at the most 8° C., such as at the most 6° C. including at the most 2° C., such as at the most −0.5° C.

The starter culture concentrate may also be combined with further components which aid the fermentation activity of the starter culture and/or the milk clotting enzyme such as e.g. bacterial nutrients including carbon sources, nitrogen sources, vitamins and micronutrients, milk clotting enzyme stabilizing agents and a chlorine neutralizing agent. Suitable milk clotting enzyme stabilizing agents include substances which protects the enzymes against oxidizing substances such as chlorine which may be present in the water supply or which are used as disinfecting agents in process line cleaning procedures. Examples of such stabilizing agents include amino acids such as methionine, peptides, proteins and ascorbic acid.

Additionally, it is possible to add milk product additives to the enclosure containing the starter culture such as e.g. a flavouring agent, a colouring agent, a fermented milk thickening agent and a fermented milk stabilizing agent.

In a further aspect, the invention pertains to a delivery system which is useful in the above method and which is designed for inoculation of a dairy starter culture into the dairy process line. Although it is currently preferred to use the system for introducing a starter culture into a closed process line, it is evident that the design of the delivery system permits it to be used also in other conventional process systems such as non-closed batch systems.

The system comprises, as described above, a sealed enclosure containing a concentrate of a starter culture and/or a milk clotting enzyme. The enclosure is provided with outlet means for connecting the enclosure to the dairy process line, said outlet means permitting the connection of the enclosure to the dairy process line to obtain delivery of the starter culture into the process line.

In a specific embodiment the sealed enclosure is further provided with inlet means permitting that an aqueous medium is introduced substantially aseptically into the enclosure.

The enclosure which functions as a packaging for the starter culture can be of any design, configuration or shape and can be made of any material which is compatible with the usage as containment of dairy starter cultures, i.e. the material must be non-toxic to the culture organisms and it must be of a food grade type and quality. Enclosures or suspension containers made of a non-flexible material can have any suitable shape such as e.g. having the shape of a bottle, a cylinder, a drum, a barrel, a box or a jar, in any case provided with a closure element such as a lid or a cap.

Although it is conceivable that non-flexible materials such as e.g. cardboard lined with a polymer and/or a metal foil, non-flexible polymeric materials, glass and metals can be used, it is currently preferred that the sealed enclosure is made of a flexible material, since, as it is described above, this facilitates that the enclosure can be shrinked by applying vacuum after filling the starter culture into the enclosure.

In preferred embodiments the enclosure is designed as a bag having an opening for loading with starter culture, which is delimited by sealable parts, and means permitting the enclosure to be suspended. Furthermore, the sealed enclosure can be provided with threaded outlet means to permit screw connection of the enclosure to the process line or any other connection providing a substantially aseptical introduction of the starter culture suspension into the process line. The screw connection can be further protected against any damages under transportation with a screw cap which is removed prior to the connection of the enclosure to the process line. In a specific embodiment, the outlet means of the enclosure comprises one or more layers of a metal foil, such as an aluminium foil, to prevent introduction of atmospheric air into the sealed enclosure. Furthermore, the enclosure may comprise a clip or any other means for separating the starter culture concentrate in the enclosure from the outlet means.

When loaded with the starter culture, the enclosure is sealed to prevent air from entering into it. The mode of sealing will depend on the material. Thus, when the material is a thermoplastic material, the sealing is conveniently provided by applying heat to the parts of the material forming the opening while compressing the opposite parts. Other modes of sealing include use of adhesives.

Such a flexible enclosure will when it is loaded, evacuated and sealed typically have the appearance of a "flat bag". Thus, in a specific embodiment, the enclosure is filled with non-atmospheric gas after evacuation.

The flexible material may comprise one or more layers of a polymeric material which is compatible with the use in a food production method and such polymers can be selected from a polyolefin, a substituted olefin, a copolymer of ethylene, a polyester, a polycarbonate, a polyamide, an acrylonitrile and a cellulose derivative, or a mixture thereof. In useful embodiments the material may be made of at least two layers of polymers such as at least three layer.

Additionally, the flexible enclosure material may comprise a metal foil or at least one layer of paper, optionally in combination with one or more layers of polymer in the form of composite materials.

In the below table an example is given of the composition of the flexible enclosure material comprising three layers of a polymeric material and one layer of an aluminium foil.

|  | thickness ($\mu$m) | weight (g/m$^2$) |
|---|---|---|
| PETP | 12.0 | 16.8 |
| binding material | 2.6 | 2.6 |
| Alu | 9.0 | 24.3 |
| binding material | 2.6 | 2.6 |
| OPA | 15.0 | 17.3 |
| binding material | 1.8 | 1.8 |
| PE | 70.0 | 64.3 |
| TOTAL | 113.0 | 129.7 |

The general design and the function of the various elements of the enclosure and peculiarities with respect to the starter culture and other component which can be enclosed in the enclosure have been described above. As has also been mentioned that the cubic content of the enclosure can be chosen to conform to particular end user requirements.

The fulfilment of such specific requirements may include that the aqueous medium holding capacity of the enclosure is selected so as to provide an amount of starter culture and/or milk clotting enzyme which is required for the production of one batch of dairy product or a multiplicity of batches.

It is thus a significant feature of the delivery system according to the invention that it provides the possibility to supply "customized" or tailor-made packagings of starter culture and/or milk clotting enzyme, not only with respect to amounts of active components but also in respect of the selection of starter culture strains and composition of multistrain starter cultures.

From the above description of the use of the delivery system in the method according to the invention it is evident that a major advantage associated with the delivery system is the fact that it makes it possible to inoculate the milk in a closed dairy process line with the starter culture without opening the closed system to the environment.

The amount of the starter culture which is packaged in the system according to the invention depends on the concentration of viable cells (cfu/g of culture) and the dilution rate which is desired. Typically, the amount of culture will be amount which, when the enclosure is completely filled with the aqueous medium, will result in a proportion of culture which is in the range of 1 to 50% (w/v), such as the range of 1 to 33.3% including the range of 1 to 25%, e.g. 1 to 10%.

BRIEF DESCRIPTION OF THE DRAWINGS

The invention is further illustrated in the following examples and the drawings wherein.

EXAMPLE 1

Figure 1:
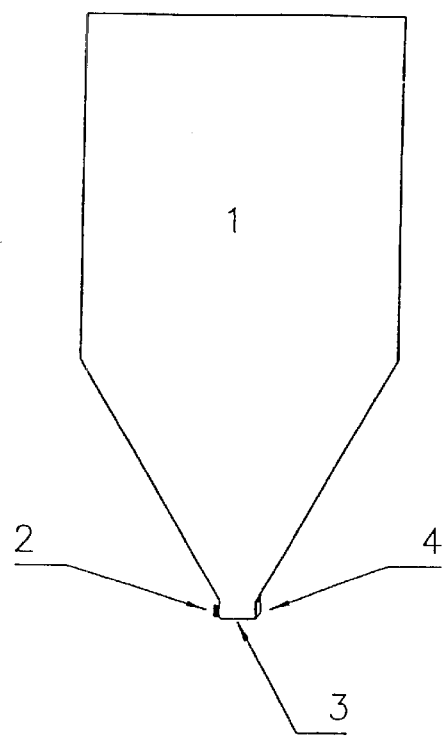
FIG. 1 illustrates an enclosure (1) comprising outlet means (2) threaded to permit screw connection. The outlet means is sealed with a metal foil (3) and protected with a screw cap (4).
Figure 2:
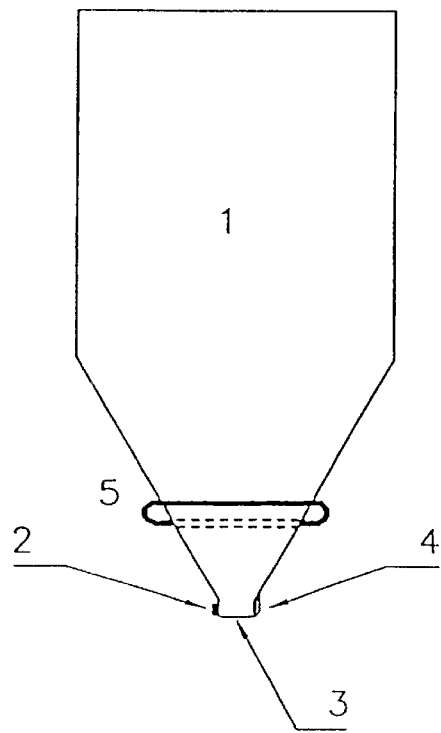
FIG. 2 illustrates an enclosure (1) comprising outlet means (2) threaded to permit screw connection and provided with a clip (5) for separating the starter culture from the outlet means (2). The outlet means is sealed with a metal foil (3) and protected with a screw cap (4).
Figure 3:
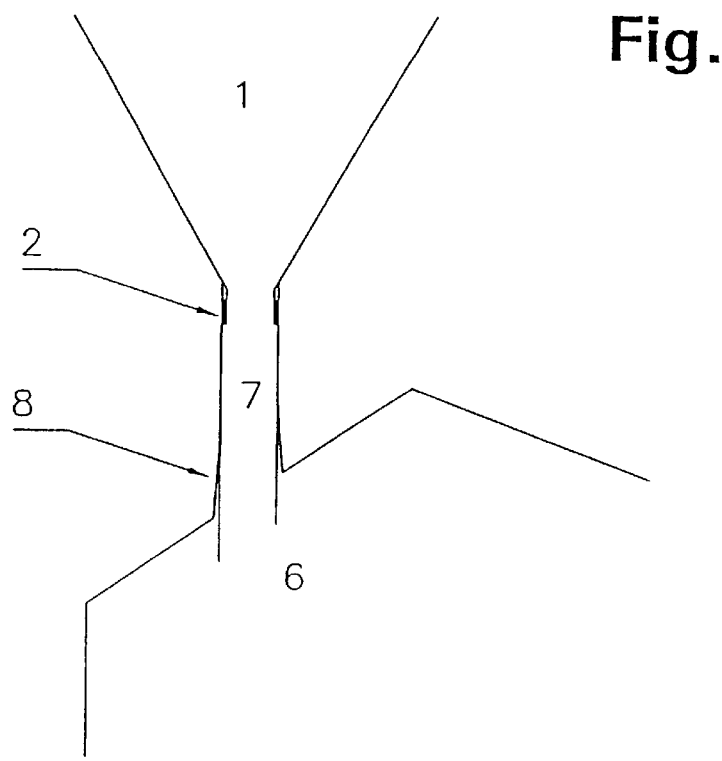
FIG. 3 illustrates the connection between the enclosure (1) and the process line (6). The outlet means (2) of the enclosure is engaged with a pipeline (7) connected to the inlet means (8) of the process line (6).
Figure 4:
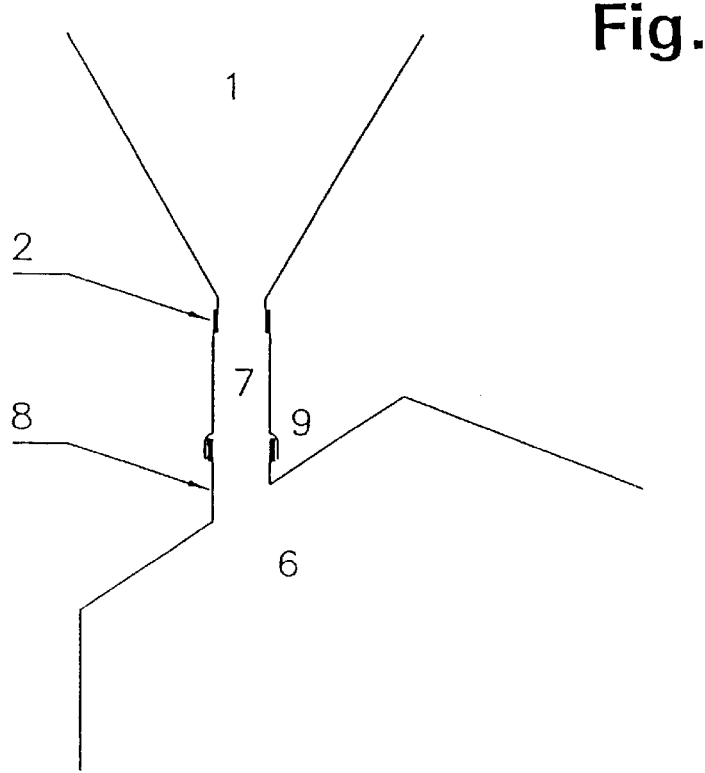
FIG. 4 illustrates the connection between the enclosure (1) and the process line (6). The outlet means (2) of the enclosure is engaged with one end of a pipeline (7). The other end of the pipeline is provided with a clean-click coupling system (9) and the pipeline is connected to the inlet means (8) of the process line (6).
Figure 5:
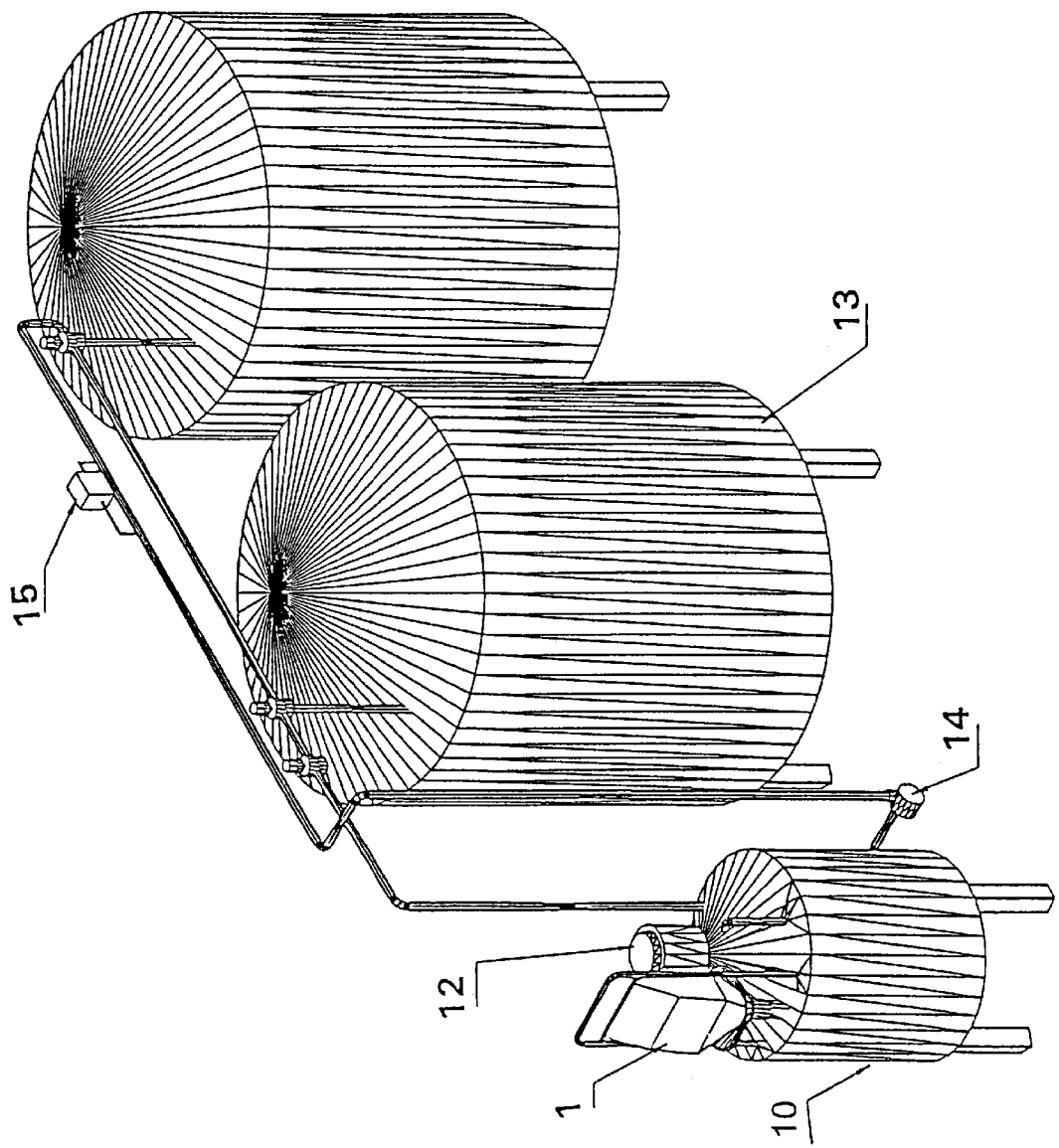
FIG. 5 illustrates the application of the delivery system in a dairy plant where a enclosure (1) is connected to a suspension container (10) provided with an agitator (12) and connected to inoculation tanks (13). The introduction of the starter culture solution from the suspension container (10) is made by means of pumping means (14) and monitored by a flow transmitter (15).

Stability of Starter Cultures in Aqueous Suspensions Containing a Milk Clotting Enzyme The objective of the experiment was to test the stability of commercial mesophilic and thermophilic lactic acid bacterial starter cultures in an aqueous suspension containing a milk clotting enzyme.

1.1 Materials and Methods

Test Cultures (i) Frozen DVS-culture, LD-Culture CH—N 11™ (Chr. Hansen A/S, Hørsholm, Denmark);

(ii) Frozen DVS-culture, O-Culture R-604™ (Chr. Hansen A/S, ørsholm, Denmark;

(iii) Frozen DVS-culture, S. thermophilus TH-4™ (Chr. Hansen, ørsholm, Denmark.

The CH—N 11 culture is a multiple mixed strain culture containing Lactococcus lactis subsp. cremoris, Lactococcus lactis subsp. lactis, Leuconostoc mesenteroides subsp. cremoris and Lactococcus lactis subsp. diacetylactis. The culture produces aroma and $CO_2$. The cell concentration is at least $1 \times 10^{10}$ cfu/g.

The culture has an indicated activity in terms of acidification of an aqueous skimmed milk suspension having a dry matter content of 9.5 wt % at an inoculation rate of 0.01 wt % and incubation at 30° C. for 6 hours, which is pH 5.00 to 5.50 and it is used in the production of fermented milk, butter and cheese varieties with eyes such as Gouda and Edam.

The R-604 culture is a defined strain culture with improved resistance to bacteriophages. The culture contains Lactococcus lactis subsp. cremoris and Lactococcus lactis subsp. lactis and it does not produce $CO_2$. The cell concentration is at least $1 \times 10^{10}$ cfu/g and the acidification activity of the culture at the above conditions is 4.95 to 5.40.

This culture is used primarily in the production of cheeses with a closed texture, e.g. Cheddar, Feta and cottage cheese. The culture can be used in other fermented dairy product, normally in combination with other lactic acid bacterial cultures.

The TH-4 culture is a defined strain culture with improved resistance to bacteriophages. The culture contains Streptococcus thermophilus. The culture is primarily used in cheese production such as Italian cheese varieties and hard cheese. The culture can be used alone or in combination with other lactic acid bacterial cultures e.g. Lactobacillus delbrueckii subsp. bulgaricus and Lactobacillus helveticus.

The cell concentration is at least $1 \times 10^{10}$ cfu/g and the acidification activity of the culture when tested in the above skimmed milk suspension at an inoculation rate of 0.01% and incubation at 37° C. for 4 hours is 4.90 to 5.30.

Milk Clotting Enzyme

A commercial liquid microbial coagulant product Naturen STD 180™ (Chr. Hansen A/S, Harsholm, Denmark) was added to the aqueous suspending medium.

Experimental Protocol

The following mixtures were prepared for each of the above starter cultures:

(i) Test sample A containing 10 ml of the above coagulant, 10 g of culture and 10 ml of tap water boiled for 0.5 hour (33.3% culture suspension (w/v));
(ii) Test sample B containing 1 ml of coagulant, 1 g of culture and 98 ml of tap water boiled for 0.5 hour (1% culture suspension (w/v));
(iii) As control was used thawed culture directly.

The above suspensions for each of the test strains and the control culture were tested for acidification activity at an inoculation rate of 0.01% with respect to culture in skimmed milk suspension (9.5 wt % dry matter) at $T_0$ and after storage of the suspensions for 8, 24, 48 and 72 hours, respectively. The acidification activity test conditions were: incubation for 6 hours at 30° C. (CH—N 11 and R-604) or 43° C. (TH-4).

pH of the incubated reaction mixtures was monitored and the pH after 6 hours of incubation recorded as the activity. The results for the test samples were compared with the corresponding results of the control inoculated directly into the milk suspension at the start of the incubation. The difference between the activity ($\Delta$pH) of the stored suspensions of the corresponding culture and the control culture ($\Delta$pH) was calculated. Thus a positive $\Delta$pH indicates that the activity of the suspension is reduced and a negative $\Delta$pH that the activity was higher as compared to the control.

1.2 Results

The results of the experiment are summarized in the below tables:

TABLE 1.1

$\Delta$pH values for culture TH-4 after storage in aqueous suspension

| Test | Hours of storage | | | | |
|---|---|---|---|---|---|
| | 0 | 8 | 24 | 48 | 72 |
| A | −0.03 | −0.03 | 0.14 | 009 | 0.24 |
| B | −0.01 | 0.07 | 0.12 | 0.13 | 0.16 |
| Cont. (pH) | 4.57 | 4.43 | 4.46 | 4.48 | 4.46 |

TABLE 1.2

$\Delta$pH values for culture CH-N 11 after storage in aqueous suspension

| Test | Hours of storage | | | | |
|---|---|---|---|---|---|
| | 0 | 8 | 24 | 48 | 72 |
| A | 0.07 | 0.23 | 0.29 | 0.28 | 0.55 |
| B | 0.04 | 0.06 | 0.17 | 0.26 | 0.43 |
| Cont. (pH) | 5.20 | 5.17 | 5.27 | 5.27 | 5.33 |

TABLE 1.3

$\Delta$pH values for culture R-604 after storage in aqueous suspension

| Test | Hours of storage | | | | |
|---|---|---|---|---|---|
| | 0 | 8 | 24 | 48 | 72 |
| A | 0.16 | 0.24 | 0.13 | 0.21 | 0.31 |
| B | −0.01 | 0.15 | 0.21 | 0.12 | 0.12 |
| Cont. (pH) | 5.03 | 4.97 | 5.12 | 5.07 | 5.10 |

1.3 Conclusion

The general findings were that storage of the aqueous culture suspension resulted in a slight reduction in acidification activity which varied between cultures and within the individual culture, between dilution rates. Thus, the thermophilic culture TH-4 showed only a very small change in activity even after storage for 72 hours, whereas the two other suspended cultures had a loss in activity which was higher, from a practical point of view, their use as starter cultures is not impaired.

The results thus indicate that it is possible to store aqueous suspensions of starter cultures for up to 72 hours without practically significant reductions in their acidification activity.

EXAMPLE 2

Stability of Starter Cultures in Aqueous Suspensions

The purpose of the experiment was to test the stability of commercial and experimental lactic acid bacterial starter cultures after suspension in an aqueous medium under different storage conditions.

2.1 Materials and Methods

A range of commercial and experimental cultures for making Cheddar cheese was tested. The cultures tested included:

| FD-DVS | F-DVS |
|---|---|
| R-703 | R-603 |
| R-704 | R-604 |
| R-707 | R-607 |
| R-708 | R-608 |
| TH-3 | TH-3 |
| TH-4 | TH-4 |
| St-36 | St-36 |
| St121 | St121 |
| RST 743 | n.a. |
| RST 776 | n.a. |

Experimental Protocol:

The starter cultures were tested for acidification activity at an inoculation rate of 0,002% wt/vol for freeze dried cultures and 0,01% wt/vol for frozen cultures with respect to the culture in an aqueous suspension.

Step 1: In the first step the culture was suspended in an aqueous medium and kept at 10° C. for 24 hours, where nothing else is stated.

Step 2: The activity of the culture suspension obtained in step 1 was tested in pasteurised whole milk using the standard Pearce test (IDF No. 129, 1980).

pH of the suspension in step 1 and the inoculated milk of step 2 was monitored, and pH after 6 and 8 hours of incubation respectively recorded as the activity.

2.2 Results 2.2.1 Evaluation of Various Media for the use in Step 1

Step 1:

Evaluation of water, 0.9% saline solution, whole milk and 2% RSM as suspending medium in step 1. The culture R-704 was used as test culture. The culture was suspended at 4% in step 1.

TABLE 2.1

The acidification of R-704 in different aqueous media

| Unit | Test suspension | 6 hours | 8 hours |
|---|---|---|---|
| pH | R-704, water | 6,39 | 6,39 |
| pH | R-704, NaCl | 6,32 | 6,32 |
| pH | R-704, 2% RSM | 4,78 | 4,74 |
| pH | R-704, whole milk | 5,00 | 4,94 |
| ° C. | Temp. water bath | 9,93 | 9,94 |

Step 2:

The aqueous suspensions of the cultures obtained in step 1 were used to inoculate pasteurised whole milk. The activity of the suspended culture was compared to direct inoculation (Table 2.2).

TABLE 2.2

The activity of R-704, and activity by direct inoculation with DVS.

| Unit | Test suspension | 5 hours | 6 hours |
|---|---|---|---|
| pH | R-704, direct | 5,73 | 5,28 |
| pH | R-704, from water | 5,75 | 5,29 |
| pH | R-704, from saline | 5,79 | 5,34 |
| pH | R-704, from 2% RSM | 5,84 | 5,39 |
| pH | R-704, from whole milk | 5,89 | 5,45 |

As it is shown in Table 2.1, when the culture R-704 was suspended in water or in 0,9% saline both the frozen and freeze dried concentrate did not acidify these media. However, in both milk media, a substantial pH change occurs with both the frozen and freeze dried starter culture.

The acidification test in step 2 showed that slightly lower activity was found when milk was used in step 1 instead of water. Salt addition (0.9%) did not make any significant difference in respect of acidification activity in step 2 for freeze dried cultures.

Due to the significantly acidifying activity of the starter cultures in step 1 in milk media, water was chosen as dilution medium for freeze dried cultures in the following tests.

2.2.2 Evaluation of the Activity of Different Cultures after Suspension in Water The cultures were suspended in tap water (step 1) in 200 ml tubes and kept at 10° C. for 24 hours without agitation and head space gas. The cultures were completely rehydrated by turning the bottle upside down several times before the inoculation. After inoculation and incubation at 10° C., a sample were taken for the activity test (step 2). The data obtained from the activity test are shown in the tables below.

TABLE 2.3

The activity in pasteurized whole milk of culture ST121 as compared with the activity by direct inoculation with culture ST121

| Unit | Inoculation | 6 hours | 8 hours |
|---|---|---|---|
| pH | FD-DVS ST-121, from 4% suspension in water | 5,69 | 4,79 |
| pH | FD-DVS ST-121, direct | 5,65 | 4,73 |
| pH | F-DVS ST-121, from 17% suspension in water | 5,49 | 4,68 |
| pH | F-DVS ST-121, direct | 5,50 | 4,67 |
| ° C. | Temp. water bath | 37,95 | 37,91 |

As it is shown in Table 2.3, the culture ST-121 was able to maintain its full activity after having been suspended in water for 24 hours at 10° C.

TABLE 2.4

The activity in pasteurized whole milk of culture TH-4 as compared with the activity by direct inoculation with culture TH-4

| Unit | Inoculation | 6 hours | 8 hours |
|---|---|---|---|
| pH | FD-DVS TH-4, from 4% suspension in water | 6,14 | 4,88 |
| pH | FD-DVS TH-4, direct | 6,15 | 4,85 |
| ° C. | Temp. water bath | 38,18 | 38,18 |

As it is shown in Table 2.4, the culture TH-4 is able to maintain its full activity after having been suspended as freeze-dried concentrate in water for 24 hours at 10° C.

TABLE 2.5

The activity in pasteurized whole milk of suspended culture ST-36 as compared with the activity by direct inoculation with culture ST-36 in pasteurized whole milk

| Unit | Inoculation | 6 hours | 8 hours |
|---|---|---|---|
| pH | FD-DVS ST-36, from 4% suspension in water | 4,98 | 4,48 |
| pH | FD-DVS ST-36, direct | 5,60 | 4,65 |
| pH | F-DVS ST-36, from 17% suspension in water | 4,72 | 4,35 |
| pH | F-DVS ST-36, direct | 5,10 | 4,50 |
| ° C. | Temp. water bath | 37,96 | 37,93 |

The culture ST-36 maintains activity after it has been suspended in water for 24 hours.

TABLE 2.6

The activity in pasteurized whole milk of culture TH-3 as compared with the activity by direct inoculation with culture TH-3 in pasteurized whole milk.

| Unit | Inoculation | 6 hours | 8 hours |
|---|---|---|---|
| pH | FD-DVS TH-3, from 4% suspension in water | 6,29 | 5,08 |
| pH | FD-DVS TH-3, direct | 6,32 | 5,20 |
| ° C. | Temperature water bath | 37,96 | 37,93 |

The culture TH-3 maintains or even improves activity when suspended in water prior to use.

2.2.3. Evaluation of the Stability of Culture R-703 after Suspension at Different Temperatures The activity in pasteurized whole milk of culture R-703 was evaluated after suspension (step 1) at different temperatures. Suspensions were made either as 10% wt/vol or as 25% wt/vol freeze-dried cultures in tap water:

TABLE 2.7

Acidification activity of culture R-703 after suspension in water as freeze-dried concentrate at a concentration of 10% or 25% at different temperatures (step 1).

| Unit | Inoculation | 6 hours | 8 hours |
|---|---|---|---|
| pH | R-703 0,002%, direct | 5,5 | 4,77 |
| pH | R-703 10%, 10° C. | 5,51 | 4,76 |
| pH | R-703 10%, 22° C. | 5,65 | 4,87 |
| pH | R-703 10%, 30° C. | 5,64 | 4,89 |
| pH | R-703 25%, 10° C. | 5,61 | 4,81 |
| pH | R-703 25%, 22° C. | 5,62 | 4,84 |
| pH | R-703 25%, 30° C. | 5,83 | 5,02 |

It appears that the activity of R-704 is reduced or exceeds, as the temperature of the suspension medium approaches 22° C., or if the concentration of culture in the suspension approaches 25%.

TABLE 2.8

Acidification activity of culture RST-743 after suspension in water as a freeze-dried concentrate at a concentration of 10% at different temperatures (step 1).

| Unit | Inoculation | 6 hours | 8 hours |
|---|---|---|---|
| pH | RST-743, direct | 5,06 | 4,47 |
| pH | RST-743, at 6° C. | 4,93 | 4,41 |
| pH | RST-743, at 8° C. | 4,93 | 4,41 |
| pH | RST-743, at 12° C. | 5,01 | 4,44 |

The activity of culture RST-743 is relatively stable in the tested temperature interval. There is a tendency towards a lower activity at 1 2° C. than at 6° C. or at 8° C. However, the activity is still higher then the direct inoculation of freeze-dried RST-743 culture.

2.2.4 Evaluation of the Effect of Long Term Storage of a Suspension of RST 743

The effect of RST 743 was determined after suspension in water for 1, 2, 3, 4 and 7 days, respectively. The suspension of the starter culture was made in a 15 liter fermentor and was kept at 10° C. The suspension was agitated throughout.

TABLE 2.9

Activity of culture RST 743 after long term storage as a 1% suspension in water at 10° C.

| Unit | Inoculation | Measured after | 5 hours | 6 hours |
|---|---|---|---|---|
| pH | Direct inoculation | 24 hours | 5,8 | 5,12 |
| pH | Direct inoculation | 48 hours | 5,6 | 4,95 |
| pH | Direct inoculation | 72 hours | 5,62 | 4,96 |
| pH | Direct inoculation | 96 hours | 5,57 | 4,94 |
| pH | Direct inoculation | 168 hours | 5,5 | 4,88 |
| pH | Incubated material | 24 hours | 5,68 | 5,00 |
| pH | Incubated material | 48 hours | 5,83 | 5,11 |
| pH | Incubated material | 72 hours | 6,00 | 5,39 |
| pH | Incubated material | 96 hours | 5,95 | 5,24 |
| pH | Incubated material | 168 hours | 6,22 | 5,78 |

The acidification occurred even after 168 hours of suspension in tap water, and cheese could be made with the culture after this prolonged incubation time, even though substantially increased inoculation rates had to be applied.

2.2.5 The Effect of Sedimentation and Agitation of the Culture Suspension

The culture R-704 was suspended in water in a glass cylinder. The suspension was made at 4%. The culture was suspended homogeneously and left to stand for 24 hours. Sedimentation was observed both visually and by determining the acidification activity of samples from the top and from the bottom of the glass cylinder.

A clear phase at the top of the glass cylinder and heavy sediments at the bottom was observed. Activity tests were made from the top phases and from the bottom phases. Finally, a sample of the top and bottom phase was made by mixing these phases homogeneously, and the activity measured.

TABLE 2.10

The acidification activity of culture R-704 in different phases after 22 hours of sedimentation

| Unit | Inoculation | 6 hours | 8 hours |
|---|---|---|---|
| pH | R704, top sample | 5,77 | 5,00 |
| pH | R704, bottom sample | 5,31 | 4,61 |
| pH | R-704, homogeneous | 5,70 | 4,89 |
| ° C. | Temp. water bath. | 37,6 | 37,83 |

A higher activity in the bottom sample was found relative to that of the top sample.

The effect of agitation was determined for the cultures RST-776, RST-743 and R-704. There was no effect of agitation throughout the suspension period of step 1 as compared to mixing prior to taking samples. (Data only shown for culture RST-776)

TABLE 2.11

Effect of agitation in step 1 on activity of culture RST 776.

| Unit | Conditions | 6 hours | 8 hours |
|---|---|---|---|
| pH | R-776, from 4% suspension in water, with agitation | 4,88 | 4,44 |
| pH | R-776, from 4% suspension in water, no agitation | 4,91 | 4,47 |
| pH | R-776, direct inoculation | 4,89 | 4,44 |
| ° C. | Temp. water bath | 37,96 | 37,91 |

2.2.6 Evaluation of the Effect of Aeration of the Culture Suspension

Two cultures were selected for determining their ability to maintain acidification activity, when an overpressure of atmospheric air is applied to the suspension container. A 15 liter fermentor with agitation was used.

TABLE 2.12

Effect of aeration in the suspension container (step 1) on culture RST743 and on ST121

| Unit | Conditions | 6 hours | 8 hours |
|---|---|---|---|
| pH | RST-743, from 1% suspension in water, 24 h with nitrogen overpressure headspace. | 4,93 | 4,45 |
| pH | RST-743, direct inoculation. | 4,96 | 4,44 |
| pH | RST-743, from 1% suspension in water, 24 h with atmospheric air overpressure headspace. | 5,18 | 4,52 |
| pH | RST-743, direct inoculation. | 4,92 | 4,47 |
| pH | ST-121, from 4% suspension in water 24 h with atmospheric air overpressure headspace. | 6,19 | 5,07 |
| pH | ST-121, direct inoculation. | 5,87 | 4,8 |
| ° C. | Temp. water bath | 37,88 | 37,82 |

The activity was maintained when nitrogen headspace gas was used. The activity loss was significant, when a flow of atmospheric air over the surface was applied.

2.2.7 Evaluation of the Effect of Chlorine in the Suspension Water

Since chlorinated water is used in many dairy environments, the effect of chlorine addition to the suspension water (step 1) was investigated. The culture was suspended in water for 24 hours at 10° C. with chlorine added at different concentrations. The activity of the starter culture was tested (step 2).

TABLE 2.13

Effect of chlorine in the suspension water on culture RST-743.

| Unit | Conditions | 6 hours | 8 hours |
|---|---|---|---|
| pH | RST-743, from water (24 h) with 32 mg/l sodiumhypochlorite. | 4,91 | 4,44 |
| pH | RST-743, from water (24 h) with 64 mg/l sodiumhypoclorite. | 4,95 | 4,48 |
| pH | RST-743, from water (24 h) with 128 mg/l sodiumhypoclorite. | 4,85 | 4,41 |
| pH | RST-743, from tab water (24 h). | 4,89 | 4,40 |
| ° C. | Temp. water bath | 37,91 | 37,91 |

Chlorine did not inhibit the acidification activity of the culture.

What is claimed is:

1. A delivery system for inoculation of a dairy starter culture into a dairy plant process line, the system comprising a sealed enclosing packaging that is supplied to the dairy plant, said packaging containing a concentrate of a starter culture and/or a milk clotting enzyme, said packaging is provided with outlet means for connecting the enclosure to the dairy process line, said outlet means permitting the connection of the packaging to the dairy process line to obtain delivery of the starter culture into the process line.

2. A delivery system according to claim 1, wherein the outlet means is threaded to permit screw connection of the sealed enclosing packaging to the process line.

3. A delivery system according to claim 1, which is provided with means permitting the packaging to be suspended.

4. A delivery system according to claim 1, wherein the sealed enclosing packaging is provided with inlet means and outlet means for connecting the packaging to the dairy process line, said inlet means permitting that an aqueous medium is introduced substantially aseptically into the packaging and the outlet means permitting the connection of the packaging to the dairy process line to obtain delivery of the starter culture into the process line.

5. A delivery system according to claim 4 wherein the inlet means comprises means permitting the inlet means to be connected to an aqueous medium outlet.

6. A delivery system according to claim 4 wherein the inlet means comprises filtering means including a filter membrane having a pore size of at the most 0.45 µm.

7. A delivery system according to claim 1, wherein the sealed enclosing packaging is made of flexible material.

8. A delivery system according to claim 7 wherein the flexible material comprises a polymer selected from the group consisting of a polyolefin, a substituted olefin, a copolymer of ethylene, a polyester, a polycarbonate, a polyamide, an acrylonitrile and a cellulose derivative.

9. A delivery system according to claim 7 wherein the flexible material comprises a metal foil.

10. A delivery system according to claim 1 wherein a non-atmospheric gas is added prior to sealing.

11. A delivery system according to claim 1 wherein the starter culture comprises organisms selected from the group consisting of a lactic acid bacterium, a Bifidobacterium species, a Propionibacterium species, a fungal species and a yeast species.

12. A delivery system according to claim 1, wherein the culture concentrate is provided in the sealed enclosing packaging in combination with a least one component selected from the group consisting of a milk clotting enzyme, a bacterial nutrient, a milk clotting enzyme stabilizing agent, a chlorine neutralizing agent, a flavoring agent, a coloring agent, a fermented milk thickening agent and at fermented milk stabilizing agent.

13. A delivery system according to claim 12 wherein the milk clotting enzyme is selected from the group consisting of a microbial coagulant, a natural animal chymosin and a recombinantly produced animal chymosin.

14. A delivery system according to claim 1, wherein the sealed enclosing packaging has a cubic content of at least 10 liters.

* * * * *